Sept. 19, 1961  C. W. MARTIN  3,000,664
COLLAPSIBLE HOUSE FOR MOTOR VEHICLES
Filed Jan. 23, 1959  2 Sheets-Sheet 1

INVENTOR.
CHARLES W. MARTIN
BY Patrick D. Beavers
ATTY.

Sept. 19, 1961 C. W. MARTIN 3,000,664
COLLAPSIBLE HOUSE FOR MOTOR VEHICLES
Filed Jan. 23, 1959 2 Sheets-Sheet 2

INVENTOR.
CHARLES W. MARTIN
BY
Patrick D. Beavers
ATTY.

United States Patent Office 3,000,664
Patented Sept. 19, 1961

3,000,664
COLLAPSIBLE HOUSE FOR MOTOR VEHICLES
Charles W. Martin, Rte. 1, Litchfield, Nebr.
Filed Jan. 23, 1959, Ser. No. 788,534
1 Claim. (Cl. 296—23)

This invention relates to improvements in collapsible houses that are adapted to be mounted on motor vehicles.

An object of the invention is to provide a collapsible house that can be removably mounted on a motor vehicle without altering the motor vehicle in any way.

Another object of the invention is to provide a collapsible house that in extended position can be used to enable people of regular height to walk upright therein and in collapsed position will be sufficiently low to avoid excessive wind resistance.

A further object of the invention is to provide a collapsible house that can be easily extended or collapsed by one man and once extended or collapsed will remain in that position without sidesway, lateral or longitudinal shifting or any undesirable movement of any sort.

With a collapsible house of this type vacation trips can be made inexpensive and thus longer trips can be enjoyed for less than trips that involve staying in hotels and eating in restaurants. Meals can be easily served in the collapsible house since a stove is provided for this purpose.

With the above and other objects and advantages in view, the invention consists of the novel details of construction, arrangement and combination of parts more fully hereinafter described, claimed and illustrated in the accompanying drawings, in which:

Figure 1:
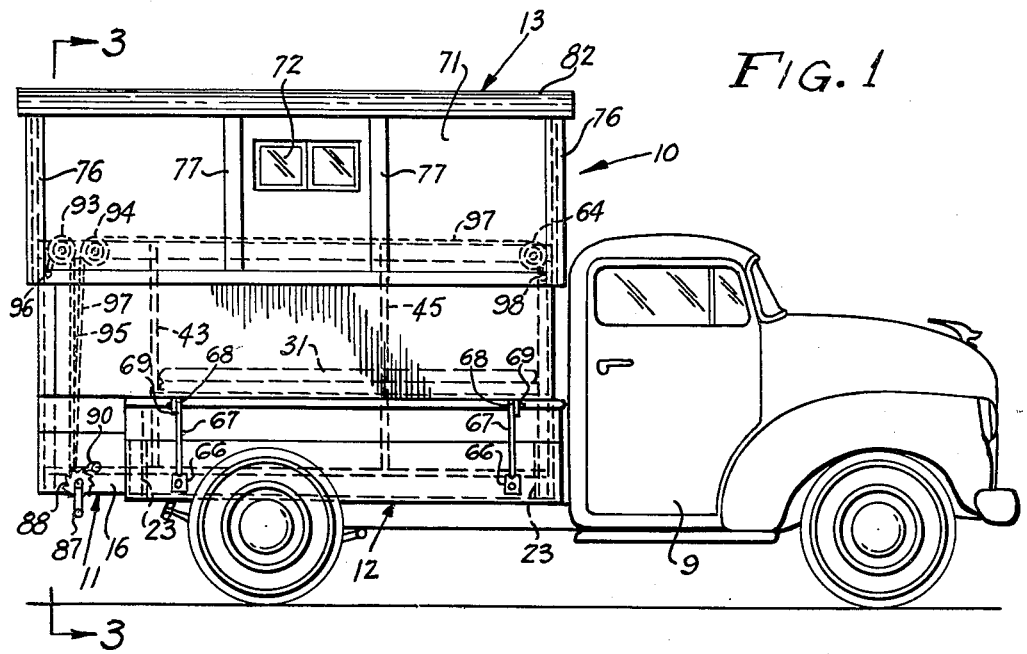
FIG. 1 is a side elevational view of a collapsible house embodying the invention in position on a truck.

Referring more in detail to the drawings wherein like parts are designated by life reference numerals, the reference number 10 is used to generally designate a collapsible house embodying the invention.

The collapsible house 10 comprises a lower section 11 that is adapted to be mounted on a truck body 12 of a motor vehicle 9 and an upper section 13 that is telescopically arranged in relation to the lower section 11.

The lower section 11 comprises side panels 14 and 15, respectively, that are of similar configuration. Each side panel includes an inset depending rear portion 16 that extends downwardly at the rear of the truck body 12 so that the floor 17 of the lower section 11 may be in a horizontal plane above the floor of the truck body 12. Reinforcing bars 18 extend longitudinally of the side panels 14 and 15 adjacent the upper and lower longitudinal edges thereof. Transverse reinforcing bars 19 extend between the lower edges of the side panels 14 and 15 and the upper edges of the rear portions 16.

A vertically disposed reinforcing post 20 is positioned at the forward edge of each of the rear edges of the side panels 14 and 15 and portions 16, and a front panel 21 is connected at its outer edges to the post 20 at the forward edges of the panels 14 and 15, a pair of ventilating windows 22 are mounted in the front panel 21 centrally thereof and adjacent the upper edge thereof.

A vertically disposed post 23 is positioned at the forward ends of the side panels 14 and 15 and at the rear edges thereof forwardly of the rear portions 16. The posts 23 are inserted into the sockets that are conventional with trucks of this type that have side boards removably mounted thereon. The posts 23 prevent lateral or longitudinal movement of the lower section 11 in relation to the truck body 12.

Figure 3:
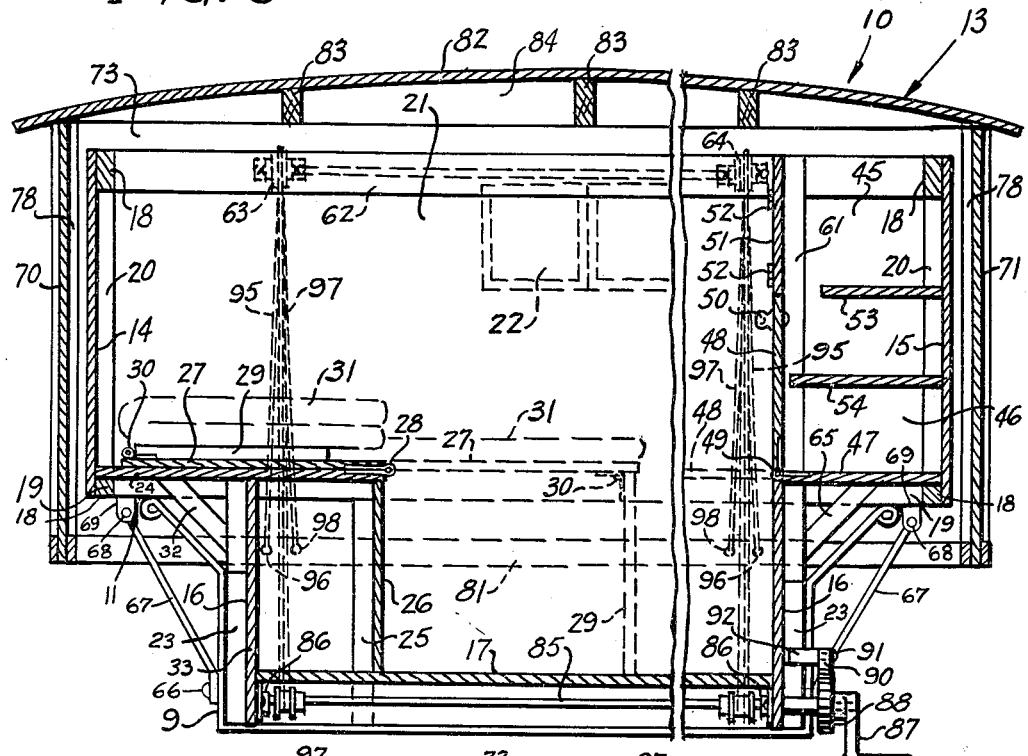
FIG. 3 is a vertical sectional view on the line 3—3 of FIG. 1.

A horizontally disposed shelf 24 extends along the side of the lower section 11 adjacent the side panel 14 and the ends of the shelf 24 rest on the reinforcing bars 19. Vertically disposed supporting posts 25 are positioned at the forward corners of the shelf 24 for the support thereof. A panel 26, having access doors therein, is secured to the outer surfaces of the posts 25 so that a storage space is provided below the shelf 24. The shelf forms half of a bed and to complete the bed a second shelf section 27 is hinged at 28 at its rear edge to the forward edge of the shelf 24 so that it can be folded outwardly to complete the bed as in FIG. 3. Legs 29 are hinged at 30 to the outer corners of the shelf 27 to support the shelf and the legs 29 rest on the shelf 27 when it is folded over onto the shelf 24. A mattress 31 is positioned on the shelves 24 and 27 in folded or extended positions, as shown in FIG. 3. Diagonally disposed brace bars 32 extend between the bottom of the shelf 24 and each of the posts 23.

Figure 4:
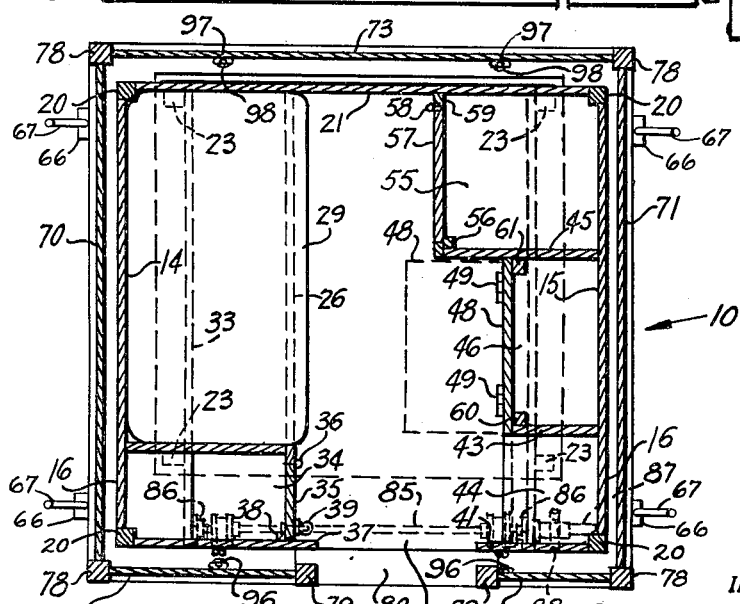
FIG. 4 is a transverse sectional view of the collapsible house drawn to a smaller scale than FIG. 3. Certain portions of this figure have been compressed in order to more clearly emphasize the floor plan of the subject invention.

A vertically disposed panel 33 extends along the length of house 10 from end panel 37 to front panel 21. As shown with dotted lines in FIG. 4, panel 33 lies beneath shelf 24 and forms a support for this shelf, as best shown in FIG. 3. That portion of panel 33 situated between post 23 and end panel 37 extends upward to the approximate upper level of side panel 14. This extension of panel 33 is not shown in FIG. 3 but such illustration is not necessary for a clear understanding of this invention. It thus appears that panel 33 forms one wall of a toilet 34. A door 35 is provided for the toilet and is hinged at 36.

Figure 2:
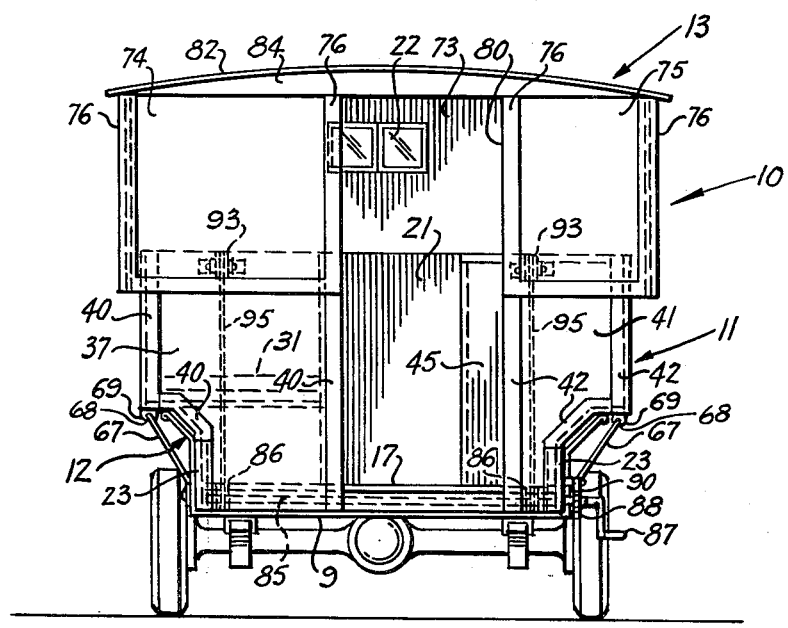
FIG. 2 is an end elevational view of FIG. 1.

An end panel 37 is secured at one vertical edge to the post 20 at the rear edge of the portion 16 adjacent the side panel 14 and a vertically disposed post 38 is secured to the panel 37 adjacent the opposite vertical edge of the panel 37. The post 38 provides a strike plate for the door 35 and a latch 39 on the door 35 engages a keeper on the post 38 to retain the door 35 in closed position. The panel 37 is shaped as shown in FIG. 2 and trim plates 40 outline the vertical edges of the panel 37.

A second end panel 41 is secured at one vertical edge to the post 20 at the rear edge of the portion 16 adjacent the side panel 15. The panel 41 is of similar shape to the panel 37 and is provided with trim plates 42. A vertically disposed panel 43 is positioned inwardly of the end panel 41 to provide a space 44 for a camp cook stove.

Another vertically disposed panel 45 is positioned inwardly of the panel 43 to provide a cupboard 46. A horizontally disposed bottom 47 for the cupboard 46 extends between the side panel 15 and the rear portion 16 and a diagonally disposed brace bar 65 extends between the bottom 47 and rear portion 16. A door 48 for the cupboard 46 is hinged at its lower edge at 49 to the forward edge of the bottom 47 and the door 48 may be folded down, as shown in FIG. 3, to provide a table. A hand knob 50 is secured to the front of the door 48 for the opening thereof. Upper doors 51 are hinged at 52 to the panels 43 and 45. Vertically spaced parallel shelves 53 and 54 are provided for the cupboard 46 and are secured at their opposite ends to the panels 43 and 45 and at their rear edges to the side panel 15. Vertically disposed posts 60 and 61 are secured to panels 43 and 45 to form strike plates for the doors 48 and 51.

The panel 45 with the front panel 21 provides a storage room 55. A vertically disposed post 56 is secured to the forward edge of the panel 45 and provides a strike plate for a door 57 that is hinged at 58 to a vertically disposed post 59 secured to the front panel 21.

Extending across the upper edge of the front panel 21 and secured at its ends to the bars 18 is a reinforcing bar 62 and a pair of pulleys 63 and 64, for a purpose to be later described, are secured to the face of the bar 62.

Brackets 66 are welded to the sides of the truck body 12 and a rod 67, having a hooked end 68 thereon, is pivotally connected to each of the brackets 66. The hooked ends 68 of the rods 67 are to engage eyes 69 secured to the lower section 11 to further retain the lower section 11 on the truck body 12.

The upper section 13 comprises side panels 70 and 71, respectively, in which are positioned ventilating windows 72. A front panel 73 in which are also positioned ventilating windows 22. Rear panels 74 and 75 that coincide with the rear panels 37 and 41 of the lower section 11 and trim plates 76 outline the edges of the panels 70, 71, 73, 74 and 75. Intermediate trim panels 77 are also positioned on the side panels 70 and 71 at opposite sides of the windows 72. Vertically disposed posts 78 are positioned at each corner of the upper section 11 and vertically disposed posts 79 are secured to the free edges of the rear panels 74 and 75 to provide door jambs for a door that will close the entrance opening 80 between the rear panels 74 and 75. A reinforcing bar 81 is secured to the lower edge of the front panel 73 and extends between the corner posts 78.

A slightly curved roof 82 covers the upper section 13 and roof rafters 83 that extend longitudinally of the upper section 13 support the roof 82 in the conventional manner.

Eaves boards 84 extend transversely of the upper section 13 and are contoured to fit the roof 82 and are secured to the roof rafters 83.

A shaft 85 extends through the rear portion 16 and is journalled in bearings 86 secured to the undersurface of the floor 17. A crank 87 is secured to the outer end of the shaft 85 and a ratchet wheel 88 is secured to the shaft 85 inwardly of the crank 87. A sleeve 89 mounted on the shaft 85 intermediate of the rear portion 16 and ratchet 88 prevents end play of the shaft 85. A dog 90 is pivoted at 91 to a stud 92 that is secured to the rear portion 16 and the dog 90 is adapted to engage the ratchet 88. A pair of pulleys 93 are secured to the upper edges of the lower section 11 in alinement with each other and adjacent the rear of the lower section 11. A second pair of pulleys 94 are secured to the upper edges of the lower section 11 in alinement with each other and forwardly of the pulleys 93. Cables 95 secured at one end to the shaft 85 are trained over the pulleys 93 and then secured at 96 to the lower rear corners of the upper section 13. Cables 97 secured at one end to the shaft 85 are trained over the pulleys 94 and 63 and 64 and are secured at 98 to the lower front corners of the upper section 13. Thus, as the crank 78 is used to rotate the shaft 85 the cables 95 and 97 will be wound on the shaft 85 to raise or lower the upper section 13 as desired, and the dog 90 by engagement with the ratchet 88 will retain the upper section 13 in fixed relation to the lower section 11.

The collapsible house 10 can be easily mounted on or removed from the truck body 9 as it is made of light wood that has been treated and painted to withstand the weather. The collapsible house is removable so that the motor vehicle 9 can be used at any time for other purposes than supporting the collapsible house 10.

When travelling over the highway the upper section 13 is lowered over the lower section 11 and thus the height of the collapsible house is reduced to eliminate wind drag and top heaviness that would be present if the upper section 13 was in raised position.

When it is desired to stop for the night the motor vehicle 9 can be parked in any convenient space and the upper section raised so that the collapsible house is ready for occupancy.

There has thus been provided a collapsible house that can be easily mounted on a motor vehicle and provide housing facilities for vacations, hunting trips, fishing trips and other trips that require overnight housing facility. A camp stove is provided for cooking, a cupboard and storage space for food and clothing and bed linen and a bed for sleeping facility. The collapsible house can also carry a chemical toilet and containers for water can also be stored therein. The collapsible house will therefore provide all the required necessities for comfortable living.

It is believed that from the foregoing description the structure and manner of use of the collapsible house will be apparent to those skilled in the art and it is to be understood that changes in the minor details of construction, arrangement and combination of parts may be resorted to provided they fall within the spirit of the invention and the scope of the appended claim.

Having thus described the invention what is claimed as new and desired to be secured by Letters Patent is:

A collapsible housing for mounting on a pick-up truck, said pick-up truck including a load carrying platform with a floor and associated sideboards, said collapsible housing, comprising an oblong lower room section having a floored center portion arranged adjacent to, and parallel with the load carrying platform of said truck between the sideboards thereof, said section including laterally extending side portions overlying said sideboards and a dependent rear end portion extending downwardly below the floor of said center portion, upper and lower reinforcing bars extending along each of said side portions and transverse bars connecting said first named bars, vertical posts disposed adjacent the corners of and rigid with said lower section and extending below the floor thereof and seating in sockets in said truck platform, an upper section telescopically arranged above said lower section, and means for raising and lowering said upper section comprising a shaft mounted on said dependent end portion and extending transversely of said truck, said shaft having a hand crank at one end thereof, pulleys mounted on said lower section adjacent the upper edge thereof, there being two pulleys forward and spaced transversely of the truck and two rear pulleys likewise disposed, cables trained over said pulleys and connected to the lower portion of said upper section and to said shaft, and releasable lock means for preventing rotation of said shaft.

References Cited in the file of this patent

UNITED STATES PATENTS

| | | |
|---|---|---|
| 1,327,589 | Bunker | Jan. 6, 1920 |
| 1,422,498 | Vint | July 11, 1922 |
| 1,852,984 | Smith | Apr. 5, 1932 |
| 2,055,930 | Josephs | Sept. 29, 1936 |
| 2,193,352 | Thomas | Mar. 12, 1940 |
| 2,292,107 | Doepke | Aug. 4, 1942 |
| 2,670,988 | Cook | Mar. 2, 1954 |
| 2,757,418 | Bergstrom | Aug. 7, 1956 |
| 2,846,262 | Ray | Aug. 5, 1958 |
| 2,879,103 | Hall | Mar. 24, 1959 |

FOREIGN PATENTS

| | | |
|---|---|---|
| 361,190 | Great Britain | Nov. 19, 1931 |
| 445,040 | Great Britain | Apr. 2, 1936 |
| 61,718 | Norway | Nov. 13, 1939 |